Feb. 17, 1953     J. J. HORAN     2,628,908
LIQUID INFANT FOOD IN MARKETABLE DISPENSERS
Filed Sept. 5, 1947     2 SHEETS—SHEET 1
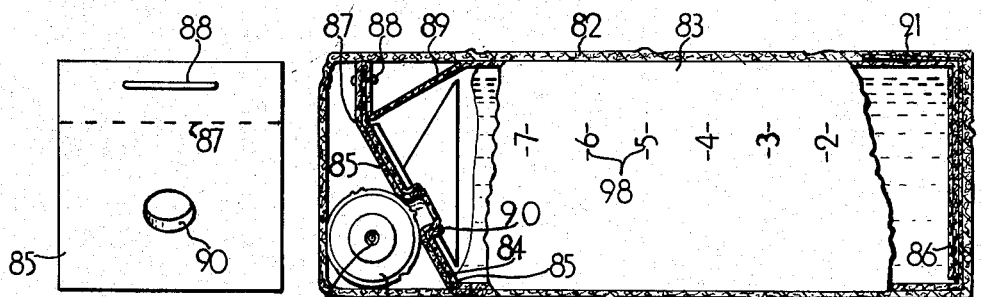
INVENTOR.
John J. Horan
BY Feb. 17, 1953 J. J. HORAN 2,628,908
LIQUID INFANT FOOD IN MARKETABLE DISPENSERS
Filed Sept. 5, 1947 2 SHEETS—SHEET 2

INVENTOR.
John J. Horan
BY

Patented Feb. 17, 1953

2,628,908

UNITED STATES PATENT OFFICE 2,628,908

LIQUID INFANT FOOD IN MARKETABLE DISPENSERS

John J. Horan, Detroit, Mich.

Application September 5, 1947, Serial No. 772,234

10 Claims. (Cl. 99—171)

This invention relates to methods and devices for packaging liquid infant food for commercial sale. The invention is novel in that it renders possible, by practicable methods at very low unit cost and in large quantities, the production and distribution of dispensing portions of scientifically balanced pure liquid infant food, manufactured and processed under strictly controlled factory conditions insuring quality, uniformity, and purity. No intermediate handling, compounding, transferring, or sterilizing by the consumer is involved.

The word "consumer" is used herein to designate anyone who purchases the filled packages through retail or similar outlets and anyone who administers the contents to an infant. "Liquid infant food" may be milk, milk product, fruit juice or synthesized baby feeding product designed or adapted for feeding to infants through a nipple. The word "processor" as hereinafter used refers to the dairy, cannery, or food processing plant which compounds, processes, pasteurizes or sterilizes the food, the above operations being performed either in the container or previous to filling, and who sterilizes and performs the final assembly operations on the package.

The word "package," as herein used, designates the combination of a container having therein a supply of infant food, plus all accessory parts contributing to sanitary protection or to the convenience of the consumer in feeding an infant. The word "container" signifies the vessel used for holding the food.

The words "destructive deformation," as used herein, signify any distortion, tearing, rupture, change of surface adhesive qualities, breaking, or other damage to any part or bond or juncture between parts resulting from separation of components after the package has been filled and closed.

It is understood that the separation is accomplished quickly by hand or by simple direct means such as knife, common can opener, or pry tool; and it is not meant to imply that separation without destructive deformation is impossible if special tools or extra precautions, not justifiable economically by the salvage value of the parts, should be employed.

Us of the words "irreplaceable" and "irreplaceably" is similarly limited.

The words "cement" and "cemented" imply optionally the use of surface applied adhesives to secure two or more components to each other, or the use of heat, pressure or combined heat and pressure to cause softening, melting or flowing of contacting surfaces in such a manner that a bond is created, which bond resists separation of the surfaces so cemented and leakage between them.

The prior art reveals many types of commercial containers adaptable to low cost manufacture in large quantities and capable of carrying solids, semi-solids and liquids. The prior art also reveals many types of nursing bottles, some of which are well suited for home cleaning, sterilizing and refilling.

However, the means disclosed in the prior art render it necessary for the individual consumer, who naturally desires to feed his baby under sanitary conditions, to perform one or more of the following operations: (1) sterilizing mixing utensils, bottles, nipples, adapters and/or other devices; (2) weighing or measuring, and mixing powders, pastes, or liquids with measured amounts of liquids; (3) sterilizing liquid infant food; (4) transferring compounded food to bottles which must be presterilized or sterilized afterwards by boiling the food in them. Infants are sometimes fed raw milk or milk which has been pasteurized but is seldom germ free. Such milk is improperly balanced nutritionally for most infants; so they are thus exposed to the dangers of infection and malnutrition. If the milk is boiled by ordinary means to sterilize it, its nutritional value is further reduced.

The means now provided by the prior art for administering products other than mother's milk to infants now give rise to the following hazards among others: (1) danger of lack of sterilization or of improper sterilization of the container, the nipple, or other accessories; (2) danger of lack of sterilization of the food or of its ingredients; (3) danger of loss of sterility of the food during compounding; (4) danger of overcooking and destroying the food value in order to insure sterilization; (5) danger of inaccurately measuring for compounding the food or of omitting one of its ingredients; (6) danger that the consumer may tend to compound the food in overly large quantities in order to reduce the frequency of making up batches of liquid infant food, thus subjecting it to spoilage; (7) waste of time and food involved in making up small batches; and (8) danger of contamination during or subsequent to preparation, owing to use of inadequate equipment.

This invention includes the following numbered elements functioning in a cooperative manner: (1) a removable outer covering to protect during handling and storage against contamination and dirt the (2) enclosed container, which is similar to commercial containers commonly utilized in the packaging of solid and semi-solid foods except for special features which are part of this invention; (3) a supply of pure liquid infant food in the container; (4) a nipple fitted to the mouth of the container, preferably folded to conserve overall height and accessible only when the (5) sealing means, which may be included in the above removable outer covering, has been removed; (6) a vent for replacing withdrawn food by air, the vent preferably inoperative until sealing means is removed; (7) a removable pin through the feeding orifice of the nipple or other temporary orifice closure to insure against flooding of the space between the sealing means and the nipple and to insure that the orifice will not be plugged or blocked by coagulated food (8) a support for suspending the container in order to permit unattended feeding of infants too young to hold the container; (9) graduations to indicate the amount of food remaining at any time.

Upon opening of these packages, the container and nipple assemblies thereby removable require no supports, brackets, holders, or other apparatus, and by themselves serve as complete nursing bottles.

This invention eliminates the present necessity for home compounding, diluting, and sterilizing of various ingredients to make food and eliminates also the laborious, time consuming and uncertainly safe home methods of cleaning and resterilizing bottles, holders, accessories, mixing spoons, utensils, etc., presently required. This invention leaves the consumer with only the duties of opening the package and warming the food to feeding temperature.

Certain practices are adapted from associated prior arts, such as: the use of graduations, presently found in various types of containers, utensils, etc.; an outer covering or wrapper which may in some cases be similar to cans, wrappers or boxes used as packages for many types of dry foods, such as crackers, etc.; and certain methods for securing the sealing means, which are adapted in part from securing methods used for containers of solid and semi-solid foods. The forms disclosed reveal new types of nipples, new means of venting, new means of securing nipples, new caps, new convenience and sanitary features such as orifice pins, etc. Even the practices borrowed from associated arts contribute in special combinations to novel utility. I do not waive any rights to the sole use of any of the novel features or cooperative combinations disclosed. Where standard means have been adopted, the purpose has been to demonstrate the applicability to this invention of certain present techniques, machinery, and materials, adaptable to economical mass production.

The invention provides a package adapted to be filled, sterilized and sealed by a commercial cannery, food preserving industry, or dairy with infant formula which may be dispensed directly without further sterilization, and without compounding or diluting ingredients.

The primary object of this invention is to provide methods by which scientifically balanced liquid infant food in concentrations suitable for direct feeding may be made up in large quantities, purified and packaged under sanitary conditions on modern packaging machinery in portions suitable for single direct feedings without waste, stored, transported, and sold through regular commercial channels, and dispensed directly to infants from the original container.

Another object of this invention is to provide handy, low cost food dispensing packages suitable for manufacture, filling, and sealing on packing machinery similar to that now used for commercial packaging of other foods, the packages to afford all possible convenience to the consumer and all possible sanitary protection to the infant.

An object of this invention is to provide nipple bearing closures for containers, the closures being suitable for economical application to containers by industries processing the food for commercial sale.

An object of this invention is to provide processes and methods for the manufacturing, processing, shipment, storage and sale of liquid infant food in hermetically sealed dispensers.

An object of this invention is to provide dispensing packages containing liquid infant food at such low cost that all components may economically be thrown away after a single use.

An object of this invention is to provide a packaged supply of liquid infant food which, if tampered with, opened or altered will reveal the effect of such tampering in the appearance of the package or of its components.

Further objects and novel features of my invention will become apparent in the balance of the specification and in its claims appended. Following are descriptions of several forms thereof as shown in the accompanying drawings in which:

Fig. 1 is a sectional view of one form of package in accordance with this invention;

Fig. 2 is a top view of the container portion of the package shown in Fig. 1, with the wrapper removed and the nipple not in place;

Fig. 3 is a sectional view of the nipple used with the container shown in Fig. 1;

Fig. 4 is a fragmentary view in which is shown the manner of assembly of the nipple shown in Fig. 3 to the container shown in Fig. 1;

Fig. 5 is a sectional view of another form of package in accordance with this invention;

Fig. 6 is a top view of the can assembly shown as part of Fig. 5;

Figure 7:
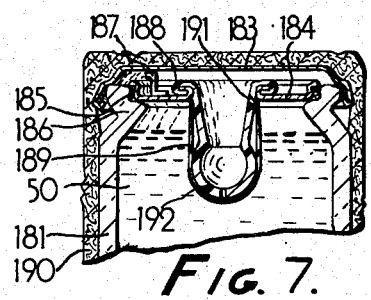
Fig. 7 is a fragmentary view of another package in accordance with this invention, with the elements shown in the shipping position.
Figure 8:
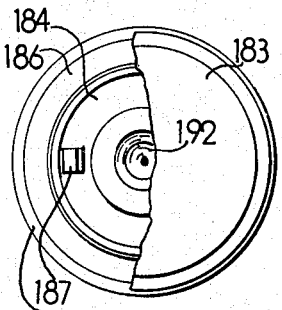
Fig. 8 is a partially cutaway top view of the package shown in Fig. 7, with the external protective covering removed.
Figure 10:
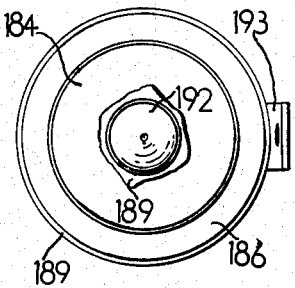
Fig. 10 is an end view of Fig. 7.

Referring now to Figs. 1, 2, 3, and 4, there is shown a package which has been selected as a vehicle for illustrating a second manner of providing a nipple, this time a separately wrapped nipple 81 enclosed under the outer protective covering 82. The body 83, inner and outer closures 84, 85 and the bottom closure 86 may be formed of a single sheet of organic material such as water proofed paper, fiber, or sheet plastic. The bottom closure 86 may be formed by slitting apart, folding over individually, and cementing together the extensions of the four sides. The other end of the body and the closures 84, 85 are formed by pinching together and securing with a staple 88 the uncut extensions of the four sides of the body in a manner similar to the folding of the top of a partially filled paper bag. The long face 84 thus formed becomes the inner closure, and the outer closure 85 is an extension of the short face 89 and is folded and inclined downwardly and detachably cemented to the outer face of the inner closure 84. A perforation 87 is provided to permit easy tearing off of the outer closure 85 prior to feeding. Alternatively, the outer closure 85 may be a separate piece detachably cemented over the portion of the blank which forms the inner closure 84 before the container blank is folded into shape. The suspension tab 91 is a pierced extension of one of the bottom closure plies.

The container is made ready for feeding by stripping the wrapper 82, partly unwrapping the nipple 81 from its wrapper 99, tearing the outer closure 85 off at its perforation 87, and forcing the nipple 81 into the nipple seat liner 90, as shown in Fig. 4, and then pulling the nipple wrapper 99 completely off the nipple 81.

Details of the nipple 81, shown in Figs. 3 and 4, reveal dual locking flanges 93, 94, the upper flange 93 being pushed back as the consumer forces the nipple 81 into the nipple seat liner 90 until the lower flange 94 has been pushed all the way through and the neck 95 is in contact with the sides of the liner 90. The lower flange 94 springs outward and locks the nipple 81 against return, the upper flange 93 and lower flange 94 then gripping opposite sides of the inner closure 84, resisting further movement of the nipple 81 in either direction. Any attempt to withdraw it is further resisted by the nipple seat liner 90 which has a sharp edge projecting inwardly. The nipple 81 is of solid construction with only a small diameter tapered hole 100 through it, in order to give extra support to the upper and lower locking flanges 93, 94. Additaments may, of course, be inserted by the consumer before the nipple 81 is applied; and venting is provided by means of molded slots 96, 97 on the faces of the upper and lower nipple flanges. This container may, preferably but not necessarily, be filled from the nipple end with liquid infant food 50 by the processor. Graduations 98 may be provided for use when the materials employed are transparent or translucent.

I have chosen this particular container as a vehicle, not because of any advantages that the "folded bag" type of container possesses for the purpose, but in spite of the disadvantages this type of construction places in the way of conversion of the container design for employment as a nursing device. A nipple closure of the type I have here applied might have been placed alternatively at the bottom of this container or in one of the other containers fabricated from organic material and illustrated elsewhere in the specification.

Referring now to Figs. 5 and 6, there is illustrated a commercially marketable liquid infant food dispensing device made of metal in the shape of the familiar can.

The preferred form of this device employs seamed sheet metal construction, departing from standard practice in certain important respects, that is, it has inner and outer closures 140 and 141 at the top, the off center flange 142 of the inner closure 140 being adapted to serve as a nipple holder. The departures, although unique, utilize a type of construction suited to the metallic container industry. The interior surface is suitably treated to protect it against chemical interaction with foods.

As shown, the off center flange 142 is closed for shipment by means of a small stamped shipping plug, which may easily be pried off by the consumer after he has warmed the dispenser, removed the casing 144, which is a strippable plastic dipped coating permitted to dry or set in place, and finally removed the outer closure 141 by means of a rotary or other smooth cutting can opener. The nipple 145, which is freed by removal of the outer closure 141, may then be secured to the off center flange 142 of the inner closure 140. A vent slot 146 molded into the nipple permits the dispenser to breathe while the infant is feeding.

Graduations 147, stamped near the outer rim of the inner closure 140, permit easy determination of the amount consumed by the infant. If the dispenser, with the nipple 145 removed, is laid on its side with the off center nipple flange 142 directly above the axis of the container, and is then rotated, the food will eventually tend to spill out if appreciable amounts are present. (A transparent plastic nipple would not require removal for visual observation.) The numbered graduation nearest the surface upon which the dispenser is resting indicates the amount in ounces remaining at the instant the surface of the liquid becomes visible at the periphery of the center flange 142.

The bottom closure 148 has an integral suspension tab 149 at its edge, the tab being folded alongside the body 150 under the casing 144 during shipment.

Referring now to Figs. 7, 8, 9, 10 and 11, there is illustrated a commercially marketable liquid infant food dispensing device, the body 181 and base 182 of which are of one piece and are especially adapted to be blown from glass or other ceramic material or to be molded from rigid plastic materials.

It will be seen that the outer closure 183 is an orthodox type of gasketed metal cap similar in some respects to types of caps used for sealing preserved fruits, jellies, etc., in glass containers at present. The inner closure 184, accessible after the outer closure 183 has been removed, fits the inside wall of the mouth 186 and is of novel design in that it is gasketed at its outside edge 185, instead of internally (as with the outer closure 183), in order to adapt it to fit the inside of the bottle mouth 186. The inner closure 184 is provided with a lift tab 187, spotwelded or otherwise secured to it, so that the consumer may pry off the inner closure 184 with a spoon handle or knife blade in a manner similar to that used in removing the outer cap.

The flange 188 of the nipple 192 is crimped securely to the upturned central flange of the inner closure 184, a waterproofed seal made of paper, plastic, or foil being positioned so as to cover the ball of the nipple 192 and to be interposed between the flange 188 of the nipple and the inner closure 184, and crimped there securely.

Figure 9:
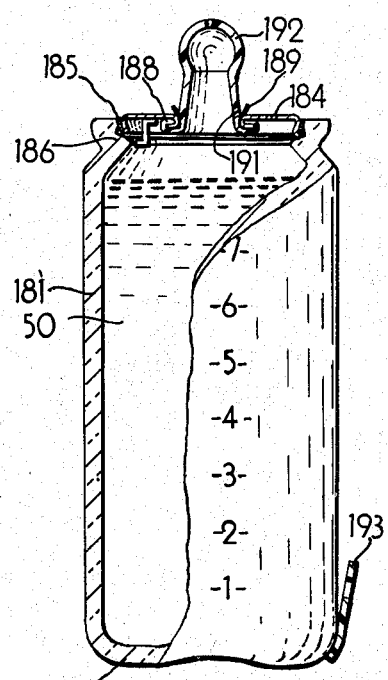
Fig. 9 is a full sectional view of the container shown as part of Fig. 7, having the inner closure assembled to it in the use position.
Figure 11:
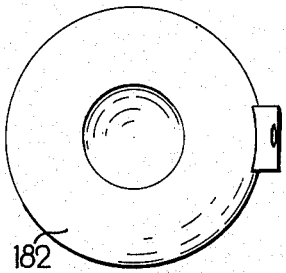
Fig. 11 is a bottom view of the container shown in Fig. 7.

The consumer warms the device, removes the outside wrapper 190, pries off successively the outer and inner closures 183 and 184, inserts such additaments as may be prescribed by the infant's physician, inverts the inner closure 184, securing it in place upside down in the mouth of the bottle, as shown in Fig. 9, and destroys the waterproof seal 189, the container then being ready for feeding to the infant.

The venting means shown is a hole 191 in the nipple 192 close to the nipple flange 188. The suspension tab 193 is preferably made of organic material, such as plastic or paper, and cemented optionally to the bottom 182 or to the side of the container as shown.

Figure 12:
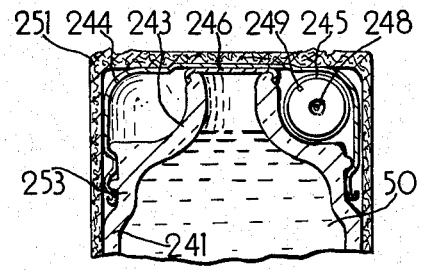
Fig. 12 is a fragmentary view of another form of package in accordance with this invention.
Figure 13:
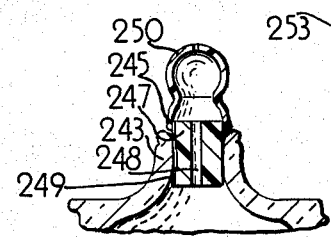
Fig. 13 is a view of the assembly shown in Fig. 12, with the elements arranged in the use position.

Referring now to Figs. 12 and 13, I have illustrated a dispenser, the body 241, base (not shown) and inner closure 243 of which are especially adapted to be blown in one piece from glass or other ceramic materials or from rigid plastic materials.

This container employs a modification of the screw type outer closure 244, such as is often used for sealing commercially packaged foods in glass containers. The body 241 has a threaded neck 253 to which the outer closure 244 is secured.

The container has an integral inwardly necked inner closure 243 of sharply reduced diameter, the annular space enclosed between the inner closure 243 and the outer closure 244 being utilized as storage space for a nipple 245 during shipment of the container.

An auxiliary closure 246, preferably made of waterproofed material or of paper plus a foil liner, covers the mouth of the inner closure 243.

The nipple 245 as illustrated employs cemented 2 piece construction. The lower portion 247 is of more or less solid construction with a through hole 248 of small diameter. The vent is a longitudinal molded slot 249 on the lower portion 247 where it fits the container. The upper portion 250, of thin material, is cemented or vulcanized to the lower portion 247.

The wrapper 251 is of orthodox construction.

The consumer warms the container, removes the wrapper 251, unscrews the outer closure 244, lifts off the auxiliary closure 246, inserts any desired additaments, forces the lower portion 248 of the nipple into the inner closure 243; and the container is ready for feeding to the infant.

Owing to the nature of organic materials presently employed in the construction of disposable milk containers and to the type of joints employed in such containers, it is generally advisable to plan only on short term refrigerated storage for such containers when filled, since at normal temperatures, the containers, which are generally incapable of maintaining hermetic sealing of their contents, particularly when roughly handled, permit bacteria to enter, causing the milk to sour. Accordingly no attempt is usually made to sterilize milk (as distinguished from pasteurize) which would spoil anyway in these containers. The reasons do not lie in the inability of the industry to manufacture permanent storage food containers, but rather in the view of the industry that the extra advantages of the latter type of container do not outweigh its additional cost.

Recognizing this fact and recognizing also that many well equipped municipal dairies can, without major installation cost, supply wholesome pasteurized food, I have provided dispenser constructions within the scope of this invention adapted for manufacture from organic materials, which, even without improvement in the classes of materials presently adapted for use in this industry, will serve with refrigerated handling as excellent combination shipping containers and feeding dispensers.

The dispensers made of organic materials (and also those of metal or glass) may be filled with properly pasteurized food instead of sterilized food, and, if proper refrigeration is provided, can be expected to keep it in wholesome condition at least as long as present containers can preserve pasteurized milk.

The dispensers made of organic material are illustrative of some of the possible variations in nipple closure and of methods of application of this invention to various types of expendable commercial vessels made of various materials and produced on different types of machinery. Some of the permissible variations in the methods of application of wrappers and outer closures as well as nipple closures have been shown in connection with the individual alternative forms.

The primary purpose of selecting the dispensers remaining in the application is to demonstrate the applicability of all of the major classifications of packaging materials to the invention to which this application is now confined, that of dispensers having nipples stored in a special position.

All containers in accordance with my invention carry outward protection not necessarily employed in present food containers. This protection is for the absolutely necessary purpose of presenting to the infant clean container surface uncontaminated by dirt or by germs deposited in handling. It is not for the purpose of adding another feature. In most cases this protection is accomplished by means of wrappers and outer closures, requiring in some instances additional machinery and equipment not presently employed in the construction of corresponding commercial containers. Similar machinery, insofar as the wrappers generally are concerned, is now employed in the packaging of foods, soaps, cigarets, etc. In some cases my outer closures bear general resemblance to present single closures. In others the outer closures may be novel. Nipples and small parts associated with my containers will of course require additional equipment for manufacture.

Containers similar in some respects to some of those disclosed herein, but lacking the nipple closures and other features essential to direct baby feeding which I have provided, have been used for any years for preserving other foods. This invention accomplishes a heretofore unattained goal through various relatively simple means, which after disclosure may appear obvious, and definitely points out the direction in which almost any type of commercial container of suitable size and shape can be modified for use in a dispenser.

It is not intended to lay down hard and fast rules for compounding liquid infant food. Milk, when used as a base, should be properly modified as to percentage of its constituents, curds should be broken down or homogenized to render it digestible, and it is desirable to provide also certain vitamins, minerals, and extracts of other foods to make up for the deficiences of ordinary milk as a diet for infants.

It will be seen that many of the forms of this invention shown have certain features in common, notably that, to representative types of commercial shipping containers used for moist and liquid foods and suitably modified in design for the purpose and functioning intended, I have added an inexpensive nipple, forming all or part of a special inner closure, under an outer closure sometimes similar to the single closures commonly used with these containers, and have provided external protection for the containers.

The container forms shown may be made, filled, sterilized, closed and packaged cheaply at the processor's plant by methods and machinery currently used for manufacture and filling of containers widely used by canning and dairy industries. Certain modifications of these methods and machinery are necessary; but the modifications are relatively slight and the extra materials inexpensive when compared with the overall cost of packaging and handling.

All of the forms shown are disposable, in that the cost of collecting, cleaning, and preparing them for reuse would normally be greater than the extremely low first cost of the container. It is conceivable that the glass containers alone, exclusive of accessories, could be salvaged and cleaned for reuse as in the present practice with milk bottles, but this is not considered an important object; and it is felt that the food will be more generally acceptable if presented in brand new containers.

The general forms of nipple assembly closure and enclosure are shown applied to representative containers of metal, glass, and organic materials, not for the purpose of including a multiplicity of forms, but primarily to demonstrate that the types of nipple assembly revealed are not restricted to certain limited applications depending upon the container selected or the material of which it is made.

The forms shown are not susceptible of complete disassembly, cleaning, reassembly, and reuse for the same purpose without replacement of resealing of some parts, differing in this respect from ordinary nursing bottles. In every case at least 2 parts, including the external protective covering and generally the outer closure and/or the nipple, either depend for their performance upon the fact that they are deformed, stressed, soldered, or cemented to provide a competent closure or are susceptible of being rendered unfit for permitting their reuse by the opening operation performed by the consumer. Even if, through use of extra care, certain types of closure may be undamaged by removal, cleaning and careful inspection for reuse would be uneconomical and might defeat in part the general purpose of the invention, which is to provide the consumer with a reliable, uniform, nourishing baby feeding formula, produced under the best attainable conditions of cleanliness and handily packaged, in order to eliminate present nuisances and—more important—present hazards in baby feeding, the chief of which is considered to be the danger of food contamination.

However, the storage limitations of containers, made of organic materials and filled with perishable food, are not peculiar to the application thereto of nipples and special forms of closures (as demonstrated by the other forms of the invention). The limitations are inherent in the properties of materials presently used for these types of containers and in the practices of the milk cartoning industry. If impervious materials are employed, if better sealing of the joints is accomplished and if inspection is improved, these types of containers may yet reach the stage where sterilized food products may be expected to keep for long periods in them.

While there have been shown and described what are at present considered to be the preferred forms of this invention, it will be obvious to those skilled in the art that various changes, modifications, and combinations may be made therein without departing from the true scope of this invention; and it is accordingly intended in the appended claims to cover such equivalents as may fall within the true scope of the invention and without the prior art. Therefore I claim:

1. A dispenser for storing, shipping, and dispensing liquid infant food, said dispenser comprising a body portion, a nipple portion, and a closure portion fully covering said nipple portion, said body portion containing a supply of liquid infant food therein, said closure portion being inseparable from said package without rendering said package and closure useless for hand reassembly without aids.

2. A package for commerce comprising: a container, said container having therein a supply of liquid infant food, said container being initially closed by an element removable therefrom, said package being incapable of intact reassembly by hand without extraneous means after disassembly of said element; nipple means initially not in contact with said food by reason of the interposition of said element, said nipple means being initially non-functionable with said container by reason of the presence of said element, said nipple being capable of functional fitment to said container upon the removal of said element; and outer covering means cooperative with said container and fully covering said nipple means and said element.

3. A package as in claim 2, said outer covering means being hermetically sealed to said container.

4. A package as in claim 2, said container having a suspension member situated at the end opposite said element, whereby said container may be positioned in a substantially inverted manner from an extraneous device for the feeding of a recumbent infant.

5. A package for commerce comprising: a container holding a supply of liquid infant food therein, said container having an opening; an inner closure for said container secured inelastically thereto; nipple means adapted to fit said container at said opening when said inner closure is removed; and an outer closure, said outer closure having been assembled over said nipple by forming said outer closure beyond its elastic limit, causing said outer closure to grip said container and to resist disassembly therefrom by hand without the use of extraneous tools.

6. A package for commerce comprising: a container holding a supply of liquid infant food therein; said container having an opening; an inner closure initially closing said opening; nipple means adapted for spanning said opening when said inner closure has been disabled by an opening process; and an outer closure, said outer closure having been assembled over said nipple and said inner closure, said outer closure being incapable of intact removal and reapplication by the unaided hand.

7. A package for commerce comprising: a container having a supply of liquid infant food therein, said container having a mouth; a closure external to the mouth of said container, said closure being not removable from said container by the unaided hand alone except with destructive deformation thereof, and a nursing nipple situated under said closure.

8. A package for commerce comprising: a container having a supply of liquid infant food therein, said container having an opening at one end thereof, sealed by a member, said member being incapable of removal and intact replacement by hand without destruction of the integrity of said member as a seal; a nipple adapted to be positioned for feeding over the said opening; and external covering means fully enclosing said nipple and member within said package.

9. A package comprising: a container fabricated from sheet material, said container having a supply of liquid infant food therein and walls enclosing same, said container having an opening in the wall at one end thereof; a detachable closure element initially closing said opening; and a nipple, said nipple having a passageway therethrough, a tip end adapted to fit the mouth of an infant and a base end having a reentrant mounting portion, said reentrant portion having oppositely projecting annular walls adapted to grip said container around said opening when said closure element has been removed.

10. A package comprising: a container having a supply of liquid infant food therein and walls enclosing same, said container having an aperture in the wall at the upper end thereof; a detachable closing element initially closing said aperture; a nipple, said nipple having a passageway therethrough, a tip end adapted to fit the mouth of an infant and a base end adapted to fit over said aperture when said detachable closing element has been removed; and outer closure means external to both said nipple and said detachable closing element, said outer closure means being adapted to be destructibly removed, whereby access is provided to said closing element and said nipple.

JOHN J. HORAN.

REFERENCES CITED

The following references are of record in the file of this patent:

UNITED STATES PATENTS

| Number | Name | Date |
|---|---|---|
| 1,344,760 | Goddard | June 29, 1920 |
| 1,425,539 | Paulsen | Aug. 15, 1922 |
| 1,623,544 | Kushner | Apr. 5, 1927 |
| 1,866,036 | Hartman et al. | July 5, 1932 |
| 2,090,749 | Corsi et al. | Aug. 24, 1937 |
| 2,093,130 | Kurkjian | Sept. 14, 1937 |
| 2,108,114 | Foard, Jr. | Feb. 15, 1938 |
| 2,158,837 | Schukraft | May 16, 1939 |
| 2,298,545 | Waters | Oct. 13, 1942 |
| 2,438,299 | Relis | Mar. 23, 1948 |
| 2,460,329 | Allen et al. | Feb. 1, 1949 |

FOREIGN PATENTS

| Number | Country | Date |
|---|---|---|
| 13,588 | Great Britain | Sept. 12, 1907 |